US010057335B2

(12) United States Patent
Xu

(10) Patent No.: US 10,057,335 B2
(45) Date of Patent: *Aug. 21, 2018

(54) DYNAMIC REGISTRATION OF AN APPLICATION WITH AN ENTERPRISE SYSTEM

(71) Applicant: VMware, Inc., Palo Alto, CA (US)

(72) Inventor: Emily Hong Xu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,240

(22) Filed: Jul. 17, 2017

(65) Prior Publication Data
US 2017/0318079 A1 Nov. 2, 2017

Related U.S. Application Data

(63) Continuation of application No. 13/914,366, filed on Jun. 10, 2013, now Pat. No. 9,723,058.

(60) Provisional application No. 61/828,155, filed on May 28, 2013.

(51) Int. Cl.
*H04L 29/08* (2006.01)
*G06F 21/45* (2013.01)
*G06F 21/33* (2013.01)

(52) U.S. Cl.
CPC ............ *H04L 67/10* (2013.01); *G06F 21/335* (2013.01); *G06F 21/45* (2013.01)

(58) Field of Classification Search
CPC .............................. H04L 67/10; G06F 21/335
See application file for complete search history.

(56) References Cited

U.S. PATENT DOCUMENTS

| 7,158,252 | B2 | 1/2007 | Kunz |
| 7,239,877 | B2 | 7/2007 | Corneille et al. |
| 7,254,888 | B2 | 8/2007 | Chu et al. |
| 8,407,776 | B2 | 3/2013 | Somani et al. |
| 8,977,246 | B2 * | 3/2015 | Kim ............. H04L 65/1083 455/414.1 |
| 2003/0160996 | A1 * | 8/2003 | Kunz ............ H04N 1/00204 358/1.15 |

(Continued)

FOREIGN PATENT DOCUMENTS

WO 2014036021 A1 3/2014

OTHER PUBLICATIONS

International Searching Authority, International Search Report and Written Opinion, PCT/US2014/032074, 12 pages, dated Aug. 5, 2014 (Aug. 5, 2014).

(Continued)

*Primary Examiner* — Arvin Eskandarnia

(57) ABSTRACT

A computer-implemented method for automatically registering an application with an enterprise system. The method includes, obtaining the application associated with the enterprise system, wherein the application is pre-configured for subsequent registration with the enterprise system such that the registration establishes a trust relationship between the application and the enterprise system. The method further includes installing the application on a host device, and in conjunction with installing the application, automatically requesting the registration of the application with the enterprise system.

26 Claims, 8 Drawing Sheets

(56) References Cited

U.S. PATENT DOCUMENTS

| | | | |
|---|---|---|---|
| 2005/0075115 A1* | 4/2005 | Corneille | G06F 8/61 455/456.3 |
| 2006/0165060 A1* | 7/2006 | Dua | G06Q 20/20 370/352 |
| 2006/0234623 A1* | 10/2006 | Wallis | G06F 8/63 455/3.01 |
| 2012/0054841 A1 | 3/2012 | Schultz et al. | |
| 2012/0210415 A1* | 8/2012 | Somani | H04L 63/0884 726/9 |
| 2013/0276086 A1* | 10/2013 | Yu | H04L 63/00 726/9 |
| 2015/0186518 A1* | 7/2015 | Kusumoto | G06Q 30/0631 709/203 |

OTHER PUBLICATIONS

Japanese Patent Application No. 2015-525653, Office Action dated Feb. 23, 2016.
Takahashi Syoichi, Technology forefront of guru to commentary, MAM (Mobile Application Manager) Control of data linkage Use a business application safely, Nikkei Systems, May 2013, NikkeiBP, Apr. 26, 2013, 241, pp. 72-77.

\* cited by examiner

500

Receive an automatically generated request to register the application with the enterprise system, wherein the request comprises one or more of: a product identification, a device identification, a requested scope of access, and an application redirect Uniform Resource Locator (URL), such that the registration establishes a trust relationship between the application and the enterprise system, and the request received in conjunction with installation of the application on a host device, wherein the application is pre-configured to automatically generate the request to register with the enterprise system 510

Receive an automatically generated request to register a mobile application 512

Register the application with the enterprise system 520

Register a mobile application with an authorization server 522

Receive a one-time access code from a mobile application 530

Send a client identification and client secret to a mobile application 540

Receive an access token from the application such that the application is enabled to access resources in the enterprise system 550

Securely enable access to resources by a mobile device, wherein the mobile device is outside a firewall of the enterprise system 560

Allow access to an application wherein the application is pre-configured to automatically request registration with the enterprise system in conjunction with installing of the application on a host device, the pre-configured application pre-populated with registration information such that a user is no longer required to manually enter the registration information, wherein the registration information comprises a product identification, a device identification, a requested scope of access, and an application redirect Uniform Resource Locator (URL), such that the registration establishes a trust relationship between the application and the enterprise system *610*

Allow access to a plurality of mobile applications *612*

Reduce manual input associated with the registering the application based on the user no longer required to manually enter the registration information *620*

Reduce manual input associated with registering a mobile application installed on a mobile device *622*

Dynamically register an application and a host device with an enterprise system, wherein a request for said registration comprises registration information selected from a group consisting of: a product identification, a device identification, a requested scope of access, and an application redirect Uniform Resource Locator (URL), such that said registration establishes a trust relationship between said enterprise system and both of said application and said device, and wherein said application is installed on said host device *710*

Authenticate a user of the host device with the enterprise system *720*

Associate the application, the host device and the user, such that the enterprise system is enabled to be scalably managed based on said trust relationship *730*

Unregister the host device with the enterprise system by removing the host device from the association *740*

Unregister the application with the enterprise system by removing an application template associated with said application *750*

Unregister a user with the enterprise system *760*

Access an application template configured to define a scope of access of an application to the enterprise system 810

Compare parameters of the application template with parameters of an automatic registration request by the application 812

Register the application with the enterprise system, wherein a request for the registration comprises: a product identification; a device identification; a requested scope of access; and an application redirect Uniform Resource Locator (URL), such that the registering establishes a trust relationship between the application and the enterprise system 820

Register the application when parameters of the application template match parameters of an automatic registration request by the application 822

Grant the scope of access defined in the application template to the application 830

*FIG. 8*

DYNAMIC REGISTRATION OF AN APPLICATION WITH AN ENTERPRISE SYSTEM

CROSS-REFERENCE TO RELATED APPLICATIONS

This application claims priority and is a continuation to the co-pending patent application Ser. No. 13/914,366, filed on Jun. 10, 2013, entitled "DYNAMIC REGISTRATION OF AN APPLICATION WITH AN ENTERPRISE SYSTEM," by Emily Hong Xu which is herein incorporated by reference in its entirety and assigned to the assignee of the present application.

The application with Ser. No. 13/914,366 claims priority to and benefit of U.S. Provisional Patent Application No. 61/828,155, filed on May 28, 2013, entitled "DYNAMIC REGISTRATION OF AN APPLICATION WITH AN ENTERPRISE SYSTEM," by Emily Hong Xu which is herein incorporated by reference and assigned to the assignee of the present application.

BACKGROUND

As a company or an enterprise grows in size, the management of access to enterprise resources becomes increasing difficult. As one example, employees of an enterprise may wish to utilize their own personal devices to access such enterprise resources. In an enterprise with only a few employees, registration of such personal devices to access enterprise resources is readily handled. For example, an IT administer or even the personal device user can manually register such personal devices to access the enterprise resources.

However, when an enterprise includes thousands of employees, such manual registration is no longer a feasible solution. Moreover, management of the enterprise resources often requires registered devices to be located within the corporate firewall. As a result, employees of the enterprise are unable to access enterprise resources from personal devices located outside of the corporate firewall.

BRIEF SUMMARY OF EMBODIMENTS

It should be appreciated that embodiments of the present invention can be implemented in numerous ways, including as a process, an apparatus, a system, a device, a method, a computer-implemented method, or a non-transitory computer-readable storage medium.

In one embodiment, a computer-implemented method for automatically registering an application with an enterprise system is provided. The computer-implemented method includes obtaining the application associated with the enterprise system, wherein the application is pre-configured for subsequent registration with the enterprise system, wherein the request for the registration includes a product identification, a device identification, a requested scope of access, and an application redirect uniform resource locator (URL), such that the registration establishes a trust relationship between the application and the enterprise system. The method also includes installing the application on a host device, and in conjunction with the installing of the application, automatically requesting registration of the application with the enterprise system.

In another embodiment, a computer-implemented method for automatically registering an application with an enterprise system is provided. The computer-implemented method includes receiving an automatically generated request to register the application with the enterprise system. The request is received in conjunction with installation of the application on a host device. The application is pre-configured to automatically generate the request to register with the enterprise system, wherein the request comprises one or more of: a product identification, a device identification, a requested scope of access, and an application redirect URL, such that the registration establishes a trust relationship between the application and the enterprise system. The embodiment also includes registering the application with the enterprise system.

In a further embodiment, a method for reducing manual input associated with registering an application with an enterprise system is provided. The method includes allowing access to an application wherein the application is pre-configured to automatically request registration with the enterprise system in conjunction with installing of the application on a host device, the pre-configured application pre-populated with registration information such that a user is no longer required to manually enter the registration information, wherein the registration information comprises a product identification, a device identification, a requested scope of access, and an application redirect URL, such that the registration establishes a trust relationship between the application and the enterprise system. The method further includes reducing manual input associated with registering the application based on the user no longer required to manually enter the registration information.

In yet another embodiment, a computer-implemented method for scalable management of an enterprise system is provided. A method includes dynamically registering an application and a host device with an enterprise system, wherein a request for the registration comprises registration information selected from a group consisting of: a product identification, a device identification, a requested scope of access, and an application redirect URL, such that the registration establishes a trust relationship between the enterprise system and both of the application and the device, and wherein the application is installed on the host device. The method also includes authenticating a user of the host device with the enterprise system, and associating the application, the host device, and an authentication code with the user, such that the enterprise system is enabled to be scalably managed.

In one embodiment, a computer-implemented method for enabling dynamic registration with an enterprise system is provided. The method includes accessing an application access template configured to define a scope of access of an application to the enterprise system, and registering the application with the enterprise system, wherein a request for the registration includes a product identification, a device identification, a requested scope of access, and an application redirect URL, such that the registering establishes a trust relationship between the application and the enterprise system. The method also includes granting the scope of access defined in the application access template to the application.

The advantages of the present invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 5 depicts a flow diagram for a method for automatically registering an application with an enterprise system, according to various embodiments.

FIG. 6 depicts a flow diagram for a method for reducing manual input associated with registering an application with an enterprise system, according to various embodiments.

FIG. 7 depicts a flow diagram for a method for scalable management of an enterprise system, according to various embodiments.

FIG. 8 depicts a flow diagram for a method for enabling dynamic registration with an enterprise system, according to various embodiments.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Figure 1:
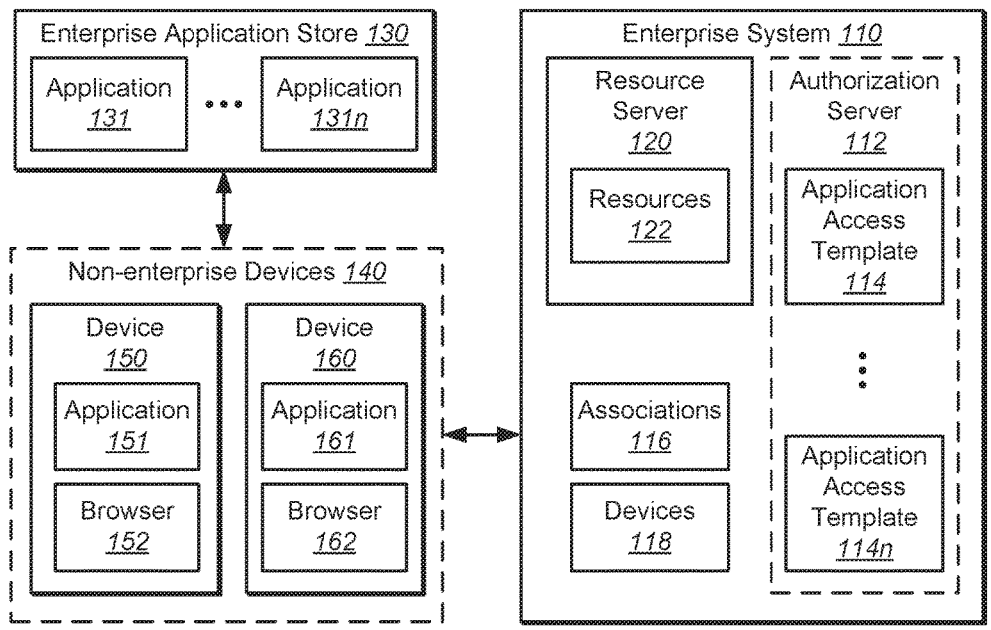
FIG. 1 is a block diagram that illustrates an embodiment of an enterprise system.

FIG. 1 depicts a block diagram that illustrates enterprise system 110, according to various embodiments. In general, enterprise system 110 is a corporate system or network that includes a combination of computer hardware and software. The corporation or enterprise may utilize the combination of hardware and software to organize and run its operations. For example, an enterprise system may provide various computing resource for various needs such as, but not limited to information technology (IT), security, email, etc.

In various embodiments, enterprise system 110 includes a plurality of devices, such as devices 118. The devices are any number of physical and/or virtual machines. For example, in one embodiment, enterprise system 110 is a corporate computing environment that includes tens of thousands of physical and/or virtual machines. It is understood that a virtual machine is implemented on one or some combination of physical computing machines.

The physical and/or virtual machines include a variety of applications (e.g., operating system, word processing, etc.).

The physical and/or virtual machines may have the same installed applications or may have different installed applications or software. The installed software may be one or more software applications from one or more vendors.

The virtual machines may include a guest operating system. The guest operating system may be a commodity operating system such as Microsoft Windows™ or a specialized operating system (sometimes referred to as a "para-virtualized OS") designed specifically to work with virtualization software (e.g., a hypervisor), which is described in further detail below.

In various embodiments, enterprise system 110 may be a cloud environment. Enterprise system 110 may be located in an Internet connected data center or a private cloud computing center coupled with one or more public and/or private networks. Enterprise system 110, in one embodiment, typically couples with a virtual or physical entity in a computing environment through a network connection which may be a public network connection, private network connection, or some combination thereof. For example, a user may couple via an Internet connection with enterprise system 110 by accessing a web page or application presented by enterprise system 110 at a virtual or physical entity.

In particular, enterprise system 110 is configured to allow dynamic device/application registration. The dynamic registration allows for scalable and secure management of enterprise system 110, which will be described in further detail below.

Enterprise system 110 includes authorization server 112 and resource server 120. Authorization server 112 provides authorization functionality and resource server 120 provides access to enterprise resources, which will be described in further detail below.

Authorization server 112 and resource server 120 may be separate servers, as depicted, or they may be distributed. Resource server 120 and/or authorization server 112 may be a virtual machine or a combination of virtual machines. Additionally, resource server 120 and authorization server 112 may operate in combination as a single server.

In various embodiments, non-enterprise devices 140 are registered with enterprise system 110 such that the devices are able to access various resources controlled by enterprise system 110. Non-enterprise devices 140, such as device 150 and device 160, may be various mobile devices. The mobile devices can be, but are not limited to, smart phones, computer tablet, personal digital assistant (PDA), and the like.

For example, various users of the devices may be employees of a corporation that utilizes and controls enterprise system 110. Typically, the users access the corporate resources (e.g., resources 122) via applications installed on registered/authorized devices (e.g., devices 118, which may be desktop or laptop computing systems) within the corporate domain or firewall. In general, a firewall facilitates in securing enterprise system 110. The firewall controls the incoming and outgoing network traffic, for example, by analyzing the data packets and determining whether the traffic should be allowed through the firewall.

Devices 118 are controlled and managed via enterprise system 110. In particular, devices 118 are registered and authorized with enterprise system 110 such that the applications utilized by devices 118 are enabled to access various corporate resources (e.g., resources 122).

However, employees of the enterprise or users of enterprise system 110 may desire to utilize their own personal devices, such as non-enterprise devices 140, to access enterprise resources. For example, a user desires to access resources 122 from user owned mobile devices (e.g., device 150 and device 160) because the user is at home and unable to access resources 122 via a device within the firewall. In another example, the user desires to utilize their own personal mobile device to quickly access resources 122 rather than from a desktop computer within the companies firewall.

Accordingly, the non-enterprise devices 140 and installed applications are dynamically registered with enterprise system 110 such that the applications may securely access resources 122 when the non-enterprise devices 140 are either outside or inside of the corporate firewall. Moreover, the dynamic registration allows for scalable and secure management of enterprise system 110, which is described in further detail below.

Example Methods of Operation

The following discussion sets forth in detail the operation of some example methods of operation of embodiments. With reference to FIGS. 3, 4, 5, 6, 7 and 8, flow diagrams 300, 400, 500, 600, 700 and 800 illustrate example procedures used by various embodiments. Flow diagrams 300-800 include some procedures that, in various embodiments, are carried out by a processor under the control of computer-readable and computer-executable instructions. In this fashion, procedures described herein and in conjunction with flow diagrams 300, 400, 500, 600, 700 and/or 800 are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments and/or cloud environments (e.g. enterprise system 110). The computer-readable and computer-executable instructions, which reside on tangible computer readable storage media, are used to control or operate in conjunction with, for example, one or some combination of processors of the computer environments and/or cloud environment. It is appreciated that the processor(s) may be physical or virtual or some combination (it should also be appreciated that a virtual processor is implemented on physical hardware). Although specific procedures are disclosed in flow diagrams 300, 400, 500, 600, 700 and/or 800, such procedures are examples. That is, embodiments are well suited to performing various other procedures or variations of the procedures recited in flow diagrams 300, 400, 500, 600, 700 and/or 800. Likewise, in some embodiments, the procedures in flow diagrams 300, 400, 500, 600, 700 and/or 800 may be performed in an order different than presented and/or not all of the procedures described in one or more of these flow diagrams may be performed. It is further appreciated that procedures described in flow diagrams 300, 400, 500, 600, 700 and/or 800 may be implemented in hardware, or a combination of hardware with firmware and/or software.

Figure 2:
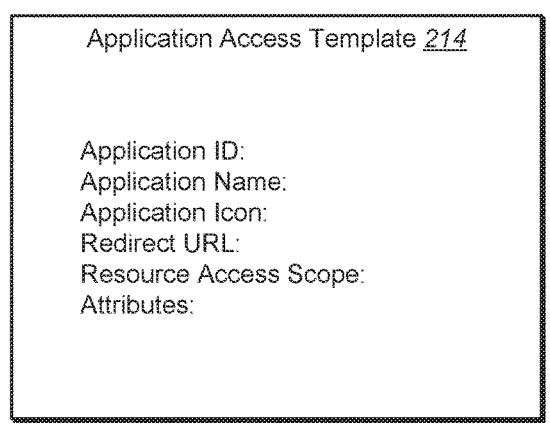
FIG. 2 is a block diagram that illustrates an embodiment of an application access template.
Figure 3:
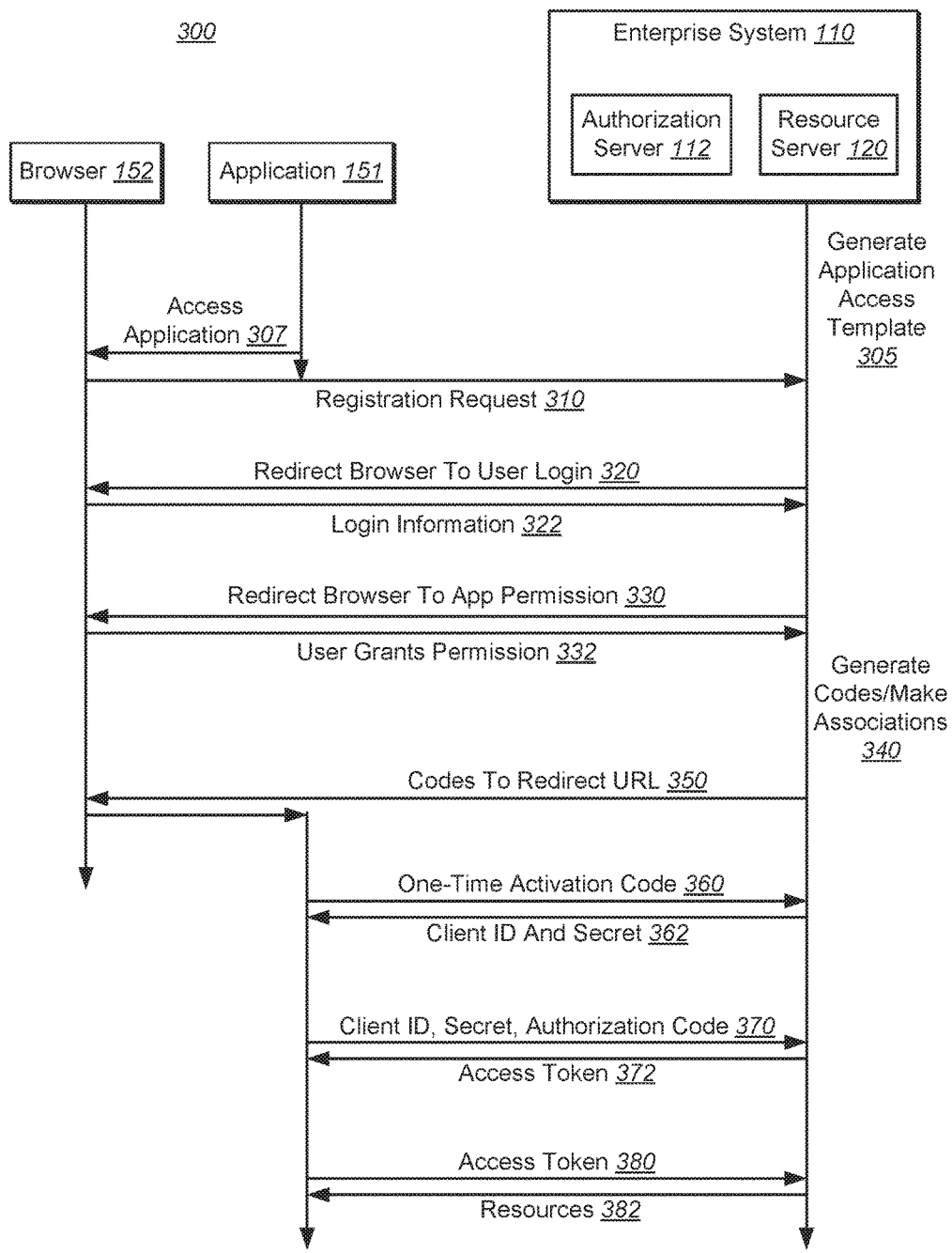
FIG. 3 depicts a process flow diagram for dynamic device/application registration, according to various embodiments.

FIG. 3 depicts a process flow diagram for dynamic device/application registration, according to various embodiments. The following description directed towards dynamic device/application registration will reference at least FIGS. 1-3.

At 305, application access templates are generated. For example, an information technology (IT) professional (e.g., organization administrator) generates one or more application access templates, such as, application access templates 114-114n. In one embodiment, application access templates 114-114n are stored in authorization server 112.

An application access template includes information or parameters specific to an application that may be utilized with enterprise system 110. In particular, an application access template is generated for each application that is utilized with enterprise system 110. For example, application access template 114 is generated for application 131, while application access template 114n is generated for application 131n.

Each application access template includes information that facilitates in registering/authorizing a particular application with enterprise system 110. In particular, each application access template facilitates in the registration/authorization of an application with resource server 120.

The application access templates are utilized for subsequent dynamic registration/authorization and enterprise management, which will be described in further detail below.

Additionally, the application access templates pre-approve applications. That is, an application is presumed to be enabled to register with enterprise system 110 and access, to some extent, resources within enterprise system 110. In contrast, any application that does not have a corresponding application access template will not be granted access to resources within enterprise system 110.

In one embodiment, an application access template defines basic authorization protocol information such as, but not limited to, OAuth 2.0 data. In general, OAuth 2.0 is an open source authorization protocol that enables a third-party application to obtain access to a Hypertext Transfer Protocol (HTTP) service.

FIG. 2 depicts an embodiment of application access template 214. For example, application access template 214 may include, but is not limited to, application ID, application name, application icon, redirect URL, resource access scope, attributes, etc.

In one embodiment, the application ID (or application product ID) is unique for each application.

In another embodiment, attributes may include, but are not limited to, whether to issue a refresh token, access token time to live (TTL), refresh token TTL, etc.).

The redirect URL (or redirect uniform resource identifier (URI)) is an endpoint that the particular application is listening on for receiving responses from enterprise system 110, such as from resource server 120 and/or authorization server 112. Each application has a different redirect URL.

In various embodiments, the resource access scope may be different with respect to each application. For example, an email application may have an access scope directed to the user's email and a word processing application may have access to various resources.

At 307, one or more applications are accessed. For example, a user of device 150 accesses one or more applications from enterprise application store 130 such that the user is able to access resources from enterprise system 110 via the one or more applications.

In particular, a user of a non-enterprise device accesses application 131 (e.g., Pages™ by Apple™) from enterprise application store 130 and downloads and installs the application onto the device. For example, a user of device 150 (e.g., iPhone™) and device 160 (e.g., iPad™) installs a word processing application from enterprise application store 130 and installs application 151 (e.g., Pages™) onto device 150, and application 161 (e.g., Pages™) onto device 160.

Enterprise application store 130 is any application repository (e.g., Google Play™) for storing applications (e.g., applications 131-131n) wherein the application may subsequently be used to access resources from enterprise system 110. In one embodiment, enterprise application store 130 may be located within enterprise system 110.

As described above, applications 131-131n are any client applications that may be utilized, upon proper registration, to access resources of enterprise system 110. In one embodiment, one or more of applications are off the shelf applications developed by third party vendors. Such applications may be modified or augmented to facilitate in subsequent registration and/or user authorization with enterprise system 110, which will be described in further detail below.

In another embodiment, one or more of the applications are customized applications for particular use with enterprise system 110. For example, such applications may be developed by third party vendors or may be developed by a party of the enterprise system.

It should be appreciated that steps 305 and 307, as described above, are not required to be accomplished sequentially. That is, generating application access templates, at 305, and accessing applications, at 307, may be done in parallel. Also, in one embodiment, accessing applications, at 307 may be accomplished prior to generating application access templates, at 305.

At 310, registration with enterprise system 110 is automatically requested. In one embodiment, the automatic registration request is to transmitted enterprise system 110. For example, the registration request is transmitted to the registered endpoint of authorization server 112.

In various embodiments, the automatic registration request is provided in conjunction with installation of the application (e.g., application 151) on the device (e.g., device 150).

As provided herein, the phrase "automatic registration request in conjunction with installation" means an automatic registration request that is associated with the installation of the application on to the device. For example, the automatic registration request may occur during installation, such as in real-time or dynamically in response to installation of the application. In another example, the automatic registration request may occur after installation and in response to the initial execution or the "start up" of the application.

The automatic registration request includes attributes pertaining to the client application and device. The registration request may include, but is not limited to, product ID, device ID, requested access scope, redirect URL, etc.

Accordingly, the client applications and devices are dynamically registered if the attributes in the application access template match, at least in part, with the attributes provided in the registration request.

As used herein, the term, "client" is intended to be broadly interpreted as an entity, such as an application, that requests resources (e.g., protected resources) in enterprise system 110.

In one embodiment, the redirect URL of the automatic registration request is the same redirect URL provided in the application access template. Accordingly, the registration is granted because the redirect URLs match one another. In contrast, if the redirect URLs do not match one another, then the registration is denied.

Additionally, a custom scheme is registered in conjunction with the installation. For example, the application endpoint is registered with the operating system (OS) of the mobile device.

It should be appreciated that the communication, depicted in steps 310 through 372, as described below, are associated with the authorization functionality of enterprise system 110, such as, authorization server 112.

At 320, the browser is redirected to a user login. For example, authorization server 112 redirects browser 152 of device 150 and/or browser 162 of device 160 to a user login window. In various embodiments, browser 152 and browser 162 are embedded or external browsers of devices 150 and 160, respectively.

It is noted that upon registration of the client application, at 310, subsequent user authentication is provided by authorization server 112, for example, an identification provider (IDP). Authorization server 112 may be located within enterprise system 110 or may be located outside of enterprise system 110.

The login prompt, displayed to the user, may include, but is not limited to a login ID and a password. It should be appreciated that any verification system that enables a user to be authorized may be utilized.

At 322, the user provides login (authentication) information. For example, the user provides a login ID and a password. In addition or in the alternative, the user may submit multi-factor authentication, such as a smart card, or SecureID® code, or some biometric verification, in addition to a password or personal identification number (PIN). The user login information is provided to authorization server 112. If the login information is verified by authorization server 112, then the verification is transmitted to resource server 120 and the user is authorized to access resources 122 of enterprise system 110.

At 330, the browser is redirected to an application permission page. That is, the user is prompted to provide permission for the application to access resources within enterprise system 110.

For example, the user will be prompted to confirm that application 151, downloaded on device 150, may access resources 122 in resource server 120 according to the scope of access provided in the application registration and/or application access template.

The request for the application permission provides additional security associated with the registration of the client application and device.

At 332, the user grants permission for the application to access resources according to the scope of access provided in the application registration and/or application access template.

In contrast, if the user does not grant permission, then the application is unable to access resources in enterprise system 110. For example, an application may be utilized with nefarious intent to access resources in enterprise system 110. Accordingly, the user, who does not intend to use the application to access the resources via the application, would not permit the application to access the resources.

At 340, various security codes are generated. For example, authorization server 112 generates a client identifier and client secret for subsequent use, by the application, to access the resources.

The client identifier is a unique string representing the registration information provided by the client application. The client identifier may be used as a username for the application authentication.

A client secret is a unique string that may be used as a password associated with the application authentication.

Authorization server 112 also generates an authorization code for subsequent use, by the application, to access resources. In particular, the authorization code is used to obtain access tokens and refresh tokens, which will be described in further detail below.

Also, at 340, the device, the application and the authorization code are associated with the user of the device. For example, device 160, application 161, and the authentication code for application 161 are associated with the user of device 160. Such association is depicted in FIG. 1 as associations 116.

Associations 116 include any number of various associations between any non-enterprise devices users and respective devices, applications, and authorization codes. Associations 116 may be any relational data structure (e.g., lookup table, linked list, etc.) that is compatible with maintaining the associations within enterprise system 110.

Moreover, associations 116 provide a foundation for enterprise system management, such as, but not limited to, user management, device management, application management, policy management, etc., which will be described in further detail below.

For example, associations 116 may also be referred to as a binding. As such, associations 116 generate a binding between, at least, device, device users and applications such that enterprise system 110 may be scalably managed. More specifically, an association between at least a device, application, and user of the device establishes a trust relationship between the enterprise system and the device, device users and applications.

At 350, codes are provided to the device via a redirect URL. For example, a one time-access code (or one-time activation code) and the authorization code are sent to browser 152 of device 150.

In one embodiment, at 350, a state parameter is provided to the device via a redirect URL. In general, a state parameter is a value used by the client application to maintain state between the request and callback.

At 360, the one-time activation code is sent from the client application to the authorization server. For example, the one-time activation code provided to the client application from the authorization server, at 350, is sent back to the authorization server from the client application via a representational state transfer (REST) application programming interface (API). The REST API is a protocol utilized to provide additional security. For example, information transmitted via a REST API is not transmitted in the clear. As a result, the information transmitted via a REST API is more secure compared to when the information is transmitted in the clear.

At 362, the client ID and client secret are transmitted to the client application. For example, in response to receiving the one-time activation code, at 350, authorization server 112 transmits the client ID and client secret, via a REST call, to application 151.

The device is able to securely store (or persist) the client ID and client secret. This enables the registered application and device, among other things, to receive the client ID and client secret a single time. Additionally, the client ID and client secret are generated based on a single authorization login by the user, at 332.

For example, application 151 is registered and receives the client ID and client secret, as described above. If the application is turned off and subsequently turned on again, at a later time, application 151 may still use the stored client ID and client secret to access resources without requiring to proceed once again through the registration/authorization steps, such as user login, at 332.

At 370, the client ID, client secret and authorization code are sent from the application to enterprise system 110. For example, the client ID, client secret and authorization code are sent to authorization server 112 via a REST call. This is done to obtain an access token or refresh token from the authorization server.

At 372, the access token or refresh token is sent to the application. For example, authorization server 112 sends application 151 an access token in response to receiving the client ID, client secret and authorization code from the application.

Access tokens are credentials used to access protected resources. An access token is a string representing an authorization issued to the client application. Tokens represent specific scopes and durations of access, granted by the resource owner, and enforced by the resource server and authorization server.

Similarly, refresh tokens are credentials used to obtain access tokens. Refresh tokens are issued to the client application by the authorization server and are used to obtain a new access token when the current access token becomes invalid or expires, or to obtain additional access tokens with identical or narrower scope (access tokens may have a shorter lifetime and fewer permissions than authorized by the resource owner).

The access token/refresh tokens are stored or persisted at the device. This enables the registered application and device, among other things, to provide an access or refresh token to the resource server based on a single login by the user.

For example, if the application 151 is turned off and subsequently turned on again, at a later time, application 151 may still utilize the stored tokens to access the resources without requiring to proceed once again through the registration or authorization steps, such as user login, at 332.

At 380, an access token or refresh token is transmitted to the resource server. For example, the access token or refresh token, stored at the client device, is transmitted to resource server 120, via a REST call.

At 382, resources are accessed by the application. For example, by providing an access token to resource server 120, application 151 is able to access secure resources 122.

The process steps for dynamic device/application registration, as depicted in FIG. 3, allows for dynamic, scalable and secure management of enterprise system 110. For example, any number of applications can be pre-registered via application access templates 114-114n. Accordingly, any number of devices (e.g., mobile devices) can include any number of applications, that when dynamically registered, may access enterprise system resources. The dynamic registration may be accomplished based on the automatic registration request which reduces the manual intervention for the registration of the applications and devices. Moreover, user authorization requires a single login, for example, at 332.

Additionally, management of enterprise system 110 may be dynamically configured and scalable. In one embodiment, if any devices (e.g., device 150 and device 160) are lost, the access tokens for the devices may be revoked. For example, a search is provided for device 150 and device 160 in associations 116. Once device 150 and device 160 are accessed in associations 116, device 150 and device 160 are removed from associations 116 and the tokens generated for the devices are revoked. As a result, the devices and installed applications are unable to access resources 122.

In another embodiment, access to resources by any application may be revoked. For example, application 151 is initially authorized to access resources 122. However, application 151 may become corrupted (e.g., virus, bug, etc.). Accordingly, the application access template (e.g., application access template 114) associated with application 151 may be removed from authorization server 112. As a result, any instance of application 151 is un-registered and unable to access resources 122.

It is noted that any of the procedures, stated above, regarding flow diagram 300 may be implemented in hardware, or a combination of hardware with firmware and/or software. For example, any of the procedures are implemented by a processor(s) of a cloud environment and/or a computing environment (e.g., non-enterprise devices 140, enterprise system 110, etc.)

Figure 4:
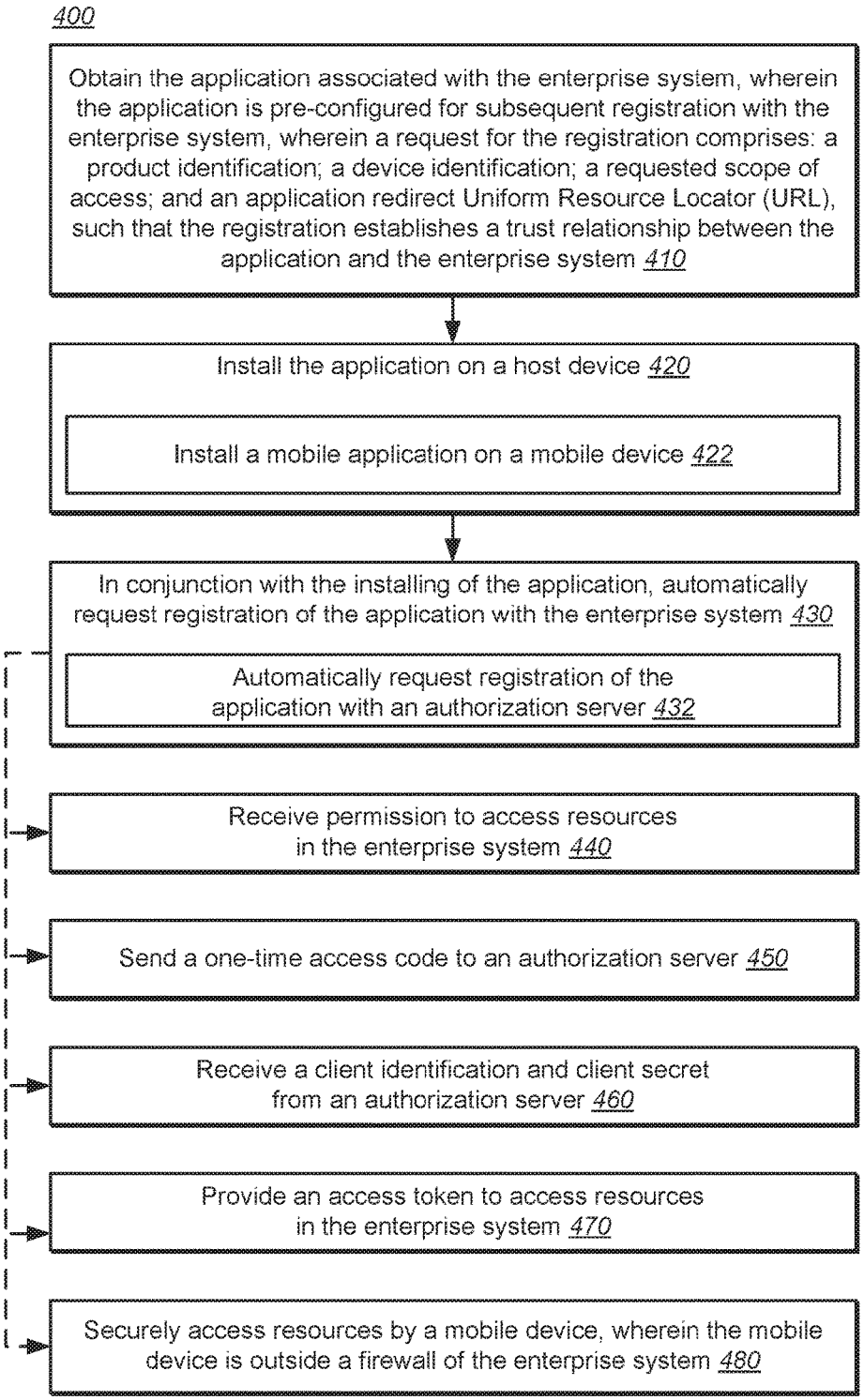
FIG. 4 depict a flow diagram for a method for automatically registering an application with an enterprise system, according to various embodiments.

FIG. 4 depicts a flow diagram for a method for automatically registering an application with an enterprise system, according to various embodiments.

Referring now to FIG. 4, at 410, the application associated with the enterprise system is obtained, wherein the application is pre-configured for subsequent registration with the enterprise system.

For example, an application is selected from enterprise application store 130 to be installed on device 150. The selection of one or more applications, in one embodiment, may occur in response to a user selecting the one or more applications to be installed on the device.

It should be appreciated that the request for registration may include, but is not limited to, a product identification, a device identification, a requested scope of access, and an application redirect URL. Moreover, the registration establishes a trust relationship between the application and the enterprise system. Specifically, the completed registration process generates an association or binding between at least the non-enterprise devices, non-enterprise device users and the applications installed on the non-enterprise devices.

At 420, the application is installed on the host device. For example, application 151 is installed on device 150. The installation, in one embodiment, may occur in response to a user selecting an application from enterprise application store 130. In another embodiment, the installation may occur automatically in response to device 150 communicatively coupling to enterprise application store 130.

At 422, the mobile application is installed on a mobile device. For example, application 151 (e.g., Microsoft Outlook™) is installed on device 150 (e.g., iPhone™).

At 430, in conjunction with the installing of the application, the application automatically requests registration with the enterprise system. For example, upon installation of application 151 onto device 150, application 151 automatically requests registration with enterprise system 110.

In another embodiment, the application may automatically request registration upon an initial execution of the application on the non-enterprise device.

At 432, in one embodiment, the application automatically requests registration with a resource server. For example, a plurality of mobile applications installed on mobile device 150 automatically request registration with resource server 120 (via authorization server 112) such that the plurality of mobile applications may access secure resources 122 controlled and managed by resource server 120.

At 440, permission is received to access resources in the enterprise system. For example, a plurality of applications, installed on mobile device 150, receive permission to access resources 122. In particular, permission is received based on parameters of the application registration matching parameters of respective application access templates.

At 450, a one-time access code is sent to an authorization server. For example, the one-time activation code is provided to the client application from the authorization server. The one-time activation code is subsequently sent back to the authorization server from the client application via a REST call.

At 460, a client identification and client secret are received from an authorization server. For example, in response to receiving the one-time activation code from application 151, authorization server 112 transmits the client ID and client secret, via a REST call, to application 151.

At 470, an access token is provided to access resources in the enterprise system. For example, authorization server 112 sends applications 151 and 161 an access token in response to receiving the client ID, client secret and authorization code from the applications.

At 480, resources are securely accessed by a mobile device, wherein the mobile device is outside a firewall of the enterprise system. For example, mobile device 160 is located outside a firewall of enterprise system 110. Moreover, mobile device 160 and application 161 are properly registered and authenticated with enterprise system 110, such that application 161 is able to securely access resources 122.

It is noted that any of the procedures, stated above, regarding flow diagram 400 may be implemented in hardware, or a combination of hardware with firmware and/or software. For example, any of the procedures are implemented by a processor(s) of a cloud environment and/or a computing environment.

FIG. 5 depicts a flow diagram for a method for automatically registering an application with an enterprise system, according to various embodiments.

Referring now to FIG. 5, at 510, an automatically generated request to register the application with the enterprise system is received. The request is received in conjunction with installation of the application on a host device, wherein the application is pre-configured to automatically generate the request to register with the enterprise system. For example, an automatically generated registration request from application 161 is received at enterprise system 110. Mobile application 161 is pre-configured to automatically send a registration request in conjunction to installation on a mobile device 160.

In one embodiment, the request for registration includes one or more of, a product identification, a device identification, a requested scope of access, and an application redirect URL. Moreover, the registration establishes a trust relationship between the application and the enterprise system.

At 512, an automatically generated request to register a mobile application is received. For example, application 161 (e.g., a word processing application) automatically generated registration request is received by authorization server 112.

At 520, the application is registered with the enterprise system. For example, when one or more attributes of the registration request match with one or more attributes, respectively, of an application access template, the application is registered with the enterprise system.

At 522, in one embodiment, a mobile application is registered with a resource server. For example, a plurality of mobile applications installed on a mobile device are registered with resource server 120 (via authorization server 112).

At 530, a one-time access code from a mobile application is received. For example, a one-time access code or activation code is transmitted to authorization server 112 from a mobile application installed on a mobile device. In one embodiment, the one-time access code is sent via a REST call.

At 540, a client identification and client secret are sent to a mobile application. For example, a client identification and client secret are generated by enterprise system 110. The client identification and client secret are then sent to a registered mobile application, such as mobile application 151.

At 550, an access token is received from the application such that the application is enabled to access resources in the enterprise system. For example, an access token is sent by a registered mobile application and received by authorization server 112 such that the registered mobile application is able to access secure resources 122.

At 560, secure access to resources by a mobile device is enabled, wherein the mobile device is outside a firewall of the enterprise system. For example, mobile application 151 is installed on mobile device 150, which is located outside of the firewall of enterprise system 110. Mobile application 151 and mobile device 150 are properly registered and authorized with enterprise system 110 such that mobile application 151 is able to access secure resources 122.

It is noted that any of the procedures, stated above, regarding flow diagram 500 may be implemented in hardware, or a combination of hardware with firmware and/or software. For example, any of the procedures are implemented by a processor(s) of a cloud environment and/or a computing environment.

FIG. 6 depicts a flow diagram for a method for reducing manual input associated with registering an application with an enterprise system, according to various embodiments.

At 610, access to an application is allowed wherein the application is pre-configured to automatically request registration with the enterprise system in conjunction with installing of the application on a host device. For example, applications 131-131n are located and accessible in enterprise application store 130 for subsequent downloading to non-enterprise devices 140. Applications 131-131n are configured such that they automatically request registration with enterprise system 110 in conjunction to installation on non-enterprise devices 140.

In various embodiments, the request for registration includes a product identification, a device identification, a requested scope of access, and an application redirect URL. Moreover, the registration establishes a trust relationship between the application and the enterprise system.

In one embodiment, at 612, access is allowed to a plurality of mobile applications. For example, mobile applications 131-131n are located and accessible in enterprise application store 130 for subsequent download to various mobile devices, such as mobile device 150 and mobile device 160.

At 620, manual input is reduced associated with the registering the application by the automatic registration request. For example, automatic registration of the application with enterprise system 110 in conjunction with installing the application on a non-enterprise device eliminates any user input associated with registration of the application. For example, the user is not required to manually input any registration information such as, device identification, registration code, etc.

At 622, in one embodiment, manual input is reduced associated with the registering a mobile application installed on a mobile device. For example, a user of a mobile device is not required to manually input any registration information for registering mobile applications installed on the mobile device.

FIG. 7 depicts a flow diagram for a method for scalable management of an enterprise system, according to various embodiments.

At 710, an application and a host device are dynamically registered with an enterprise system, wherein the application is installed on the host device. For example, application 151 and device 150 are dynamically registered with enterprise system 110 based, in part, on the automatic registration of application 151 in conjunction with installation on device 150.

In various embodiments, the request for registration includes registration information selected from a group consisting of, a product identification, a device identification, a requested scope of access, and an application redirect URL. Moreover, the registration establishes a trust relationship between the application and the enterprise system.

At 720, a user of the host device is authenticated with the enterprise system. For example, authorization server 112 redirects browser 152 of device 150 to a user login window. At the user login window, the user provides login information (e.g., login name, password, etc.). If the login information is verified by authorization server 112, then the verification is transmitted to resource server 120 and the user is authorized to access resources 122 of enterprise system 110.

At 730, the application, the host device, and the user of the host device are associated with one another, such that the enterprise system is enabled to be scalably managed based on the trust relationship. For example, enterprise system 110 generates associations 116 that include an association or binding of the application, host device and an authentication code with the host user.

Associations 116 enable scalable management of enterprise system 110. For example, associations 116 may increase in scale when additional associations are generated and may decrease in scale when associations are removed.

At 740, the host device is unregistered with the enterprise system by removing the host device from the association. For example, if device 150 is lost, then device 150 may be removed from associations 116. As a result, device 150 is unregistered with enterprise system 110 and unable to access secure resources within enterprise system 110.

At 750, the application is unregistered with the enterprise system by removing an application access template associated with said application. For example, if application 151 becomes corrupted (e.g., virus), then the application access template associated with application 151 may be removed. As a result, application 151 is unregistered with enterprise system 110 and any instance of application 151 installed on any mobile device is unable to access resources in enterprise system 110. Moreover, application 151 is removed from associations 116.

At 760, the user of the host device is unregistered with the enterprise system. For example, a user that is no longer employed with the enterprise is removed from associations 116. Accordingly, the user is unable to access resources 122.

FIG. 8 depicts a flow diagram for a method for enabling dynamic registration with an enterprise system, according to various embodiments.

At 810, an application access template is accessed, wherein the application access template is configured to define a scope of access of an application to the enterprise system. For example, application access template 114 is generated to define, in part, the scope of access of the application with secure resources in enterprise system 110. Moreover, application access template 114 is enabled to be accessed, for example, by the authorization server to facilitate in registering an application with enterprise system 110.

At 812, parameters of the application access template are compared with parameters of an automatic registration request by the application. For example, parameters of an application access template (e.g., redirect URL) are compared with parameters of an automatic registration request (e.g., redirect URL) by the application.

At 820, the application is registered with the enterprise system. For example, application 151 installed on device 150 is registered with enterprise system 110.

It should be appreciated that the request for registration includes, but is not limited to, a product identification, a device identification, a requested scope of access, and an application redirect URL. Moreover, the registration establishes a trust relationship between the application and the enterprise system.

At 822, the application is registered when parameters of the application access template match parameters of an automatic registration request by the application. For example, when parameters of the application access template (e.g., redirect URL) match parameters of the automatic registration request (e.g., redirect URL) the application is registered with enterprise system 110.

At 830, the scope of access defined in the application access template is granted to the application. For example, the scope of access for a particular application is defined by the application access template. The defined scope of access is granted to the application upon registration of the application with enterprise system 110.

Example Host Computer System

Figure 9:
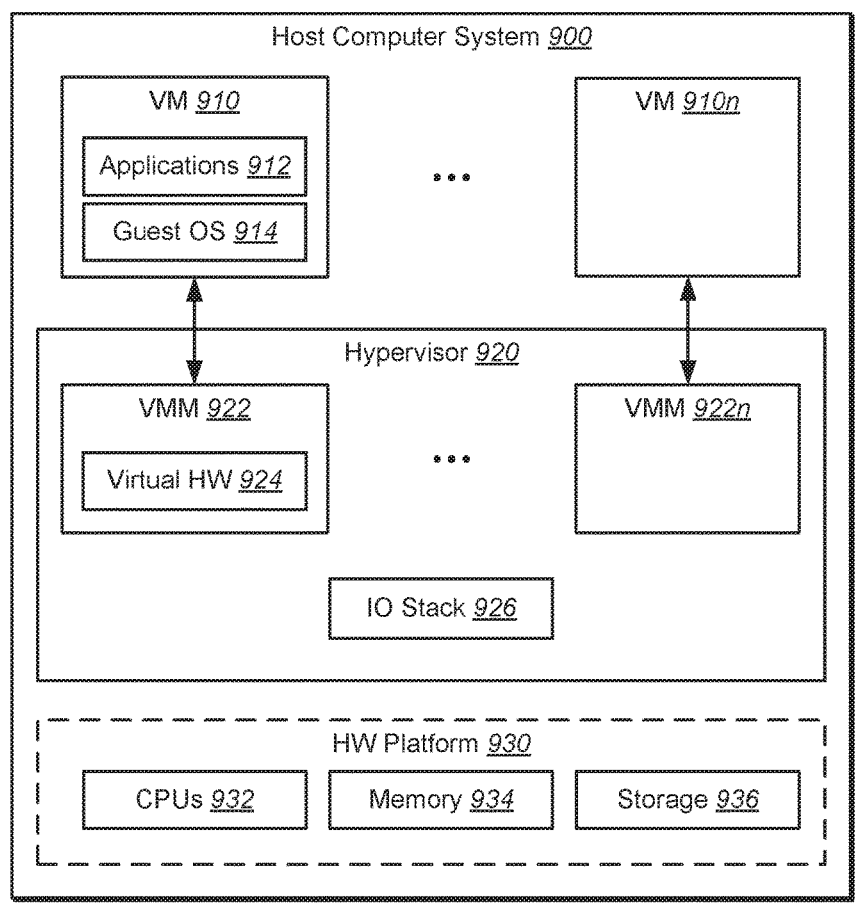
FIG. 9 depicts a block diagram that illustrates an embodiment of a host computing system.

FIG. 9 is a schematic diagram that illustrates a virtualized computer system that is configured to carry out one or more embodiments of the present invention. The virtualized computer system is implemented in a host computer system 900 including hardware platform 930. In one embodiment, host computer system 900 is constructed on a conventional, typically server-class, hardware platform.

Hardware platform 930 includes one or more central processing units (CPUs) 932, system memory 934, and storage 936. Hardware platform 930 may also include one or more network interface controllers (NICs) that connect host computer system 900 to a network, and one or more host bus adapters (HBAs) that connect host computer system 900 to a persistent storage unit.

Hypervisor 920 is installed on top of hardware platform 930 and supports a virtual machine execution space within which one or more virtual machines (VMs) may be concurrently instantiated and executed. Each virtual machine implements a virtual hardware platform that supports the installation of a guest operating system (OS) which is capable of executing applications. For example, virtual hardware 924 for virtual machine 922 supports the installation of guest OS 914 which is capable of executing applications 912 within virtual machine 910.

Guest OS 914 may be any of the well-known commodity operating systems, such as Microsoft Windows™, Linux™, and the like, and includes a native file system layer, for example, either an NTFS or an ext3FS type file system layer. IOs issued by guest OS 914 through the native file system layer appear to guest OS 916 as being routed to one or more virtual disks provisioned for virtual machine 910 for final execution, but such IOs are, in reality, are reprocessed by IO stack 926 of hypervisor 920 and the reprocessed IOs are issued, for example, through an HBA to a storage system.

Virtual machine monitor (VMM) 922 and 922*n* may be considered separate virtualization components between the virtual machines and hypervisor 920 (which, in such a conception, may itself be considered a virtualization "kernel" component) since there exists a separate VMM for each instantiated VM. Alternatively, each VMM may be considered to be a component of its corresponding virtual machine since such VMM includes the hardware emulation components for the virtual machine. It should also be recognized that the techniques described herein are also applicable to hosted virtualized computer systems. Furthermore, although benefits that are achieved may be different, the techniques described herein may be applied to certain non-virtualized computer systems.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

The invention claimed is:

1. A computer-implemented method for automatically registering an application with an enterprise system, said computer-implemented method comprising:
obtaining said application associated with said enterprise system, wherein said application is pre-configured for subsequent registration with said enterprise system, wherein a request for a registration comprises:
a product identification;
a device identification;
a requested scope of access; and
an application redirect uniform resource locator (URL), such that said registration establishes a trust relationship between said application and said enterprise system;
installing said application on a host device; and
in conjunction with said installing of said application, automatically requesting said registration of said application with said enterprise system.

2. The computer-implemented method of claim 1, wherein said installing said application on a host device further comprises:
installing a mobile application on a mobile device.

3. The computer-implemented method of claim 1, wherein said automatically requesting said registration of said application further comprises:
automatically requesting registration of said application with an authorization server.

4. The computer-implemented method of claim 1, further comprising:
receiving permission to access resources in said enterprise system.

5. The computer-implemented method of claim 1, further comprising:
sending a one-time access code to an authorization server.

6. The computer-implemented method of claim 1, further comprising:
receiving a client identification and client secret from an authorization server.

7. The computer-implemented method of claim 1, further comprising:
providing an access token to access resources in said enterprise system.

8. The computer-implemented method of claim 1, further comprising:
securely accessing resources by a mobile device, wherein said mobile device is outside a firewall of said enterprise system.

9. A computer-implemented method for automatically registering an application with an enterprise system, said computer-implemented method comprising:
receiving an automatically generated request to register said application with said enterprise system, wherein said automatically generated request comprises one or more of: a product identification, a device identification, a requested scope of access, and an application redirect uniform resource locator (URL), such that a registration establishes a trust relationship between said application and said enterprise system, and said automatically generated request received in conjunction with installation of said application on a host device, wherein said application is pre-configured to automatically generate said automatically generated request to register with said enterprise system; and
registering said application with said enterprise system.

10. The computer-implemented method of claim 9, wherein said receiving an automatically generated request to register said application further comprises:
receiving an automatically generated request to register a mobile application.

11. The computer-implemented method of claim 9, wherein said receiving an automatically generated request to register further comprises one or more of: product identification, device identification, requested scope of access, and a redirect uniform resource locator (URL).

12. The computer-implemented method of claim 9, wherein said registering said application with said enterprise system further comprises:
registering a mobile application with an authorization server.

13. The computer-implemented method of claim 9, further comprising:
receiving a one-time access code from a mobile application.

14. The computer-implemented method of claim 9, further comprising:
sending a client identification and client secret to a mobile application.

15. The computer-implemented method of claim 9, further comprising:
receiving an access token from said application such that said application is enabled to access resources in said enterprise system.

16. The computer-implemented method of claim 9, further comprising:
securely enabling access to resources by a mobile device, wherein said mobile device is outside a firewall of said enterprise system.

17. A method for reducing manual input associated with registering an application with an enterprise system, said method comprising:
allowing access to an application wherein said application is pre-configured to automatically request registration with said enterprise system in conjunction with installing of said application on a host device, said application pre-populated with registration information such that a user is no longer required to manually enter said registration information, wherein said registration information comprises a product identification, a device identification, a requested scope of access, and an application redirect uniform resource locator (URL), such that a registration establishes a trust relationship between said application and said enterprise system; and
reducing manual input associated with said registering said application based on said user no longer required to manually enter said registration information.

18. The method of claim 17, wherein said allowing access to an application further comprises:
allowing access to a plurality of mobile applications.

19. The method of claim 17, wherein said reducing manual input associated with said registering further comprises:
reducing manual input associated with registering a mobile application installed on a mobile device.

20. A computer-implemented method for scalable management of an enterprise system, said computer-implemented method comprising:

dynamically registering an application and a host device with an enterprise system, wherein a request for registration comprises registration information selected from a group consisting of: a product identification, a device identification, a requested scope of access, and an application redirect uniform resource locator (URL), such that said registering establishes a trust relationship between said enterprise system and both of said application and said host device, and wherein said application is installed on said host device;

authenticating a user of said host device with said enterprise system; and associating said application, said host device, and said user, such that said enterprise system is enabled to be scalably managed based on said trust relationship.

21. The computer-implemented method of claim 20, further comprising:

unregistering said host device with said enterprise system by removing said host device from said association.

22. The computer-implemented method of claim 20, further comprising:

unregistering said application with said enterprise system by removing an application access template associated with said application.

23. The computer-implemented method of claim 20, further comprising:

unregistering a user with said enterprise system by removing said user from said association.

24. A computer-implemented method for enabling dynamic registration with an enterprise system, said computer-implemented method comprising:

accessing an application access template configured to define a scope of access of an application to said enterprise system;

registering said application with said enterprise system, wherein a request for said registering comprises:
a product identification;
a device identification;
a requested scope of access; and
an application redirect uniform resource locator (URL), such that said registering establishes a trust relationship between said application and said enterprise system; and granting said scope of access defined in said application access template to said application.

25. The computer-implemented method of claim 24, wherein said accessing said application access template further comprises:

comparing parameters of said application access template with parameters of an automatic registration request by said application.

26. The computer-implemented method of claim 25, wherein said registering said application further comprises:

registering said application when parameters of said application access template match parameters of said automatic registration request by said application.

* * * * *